United States Patent [19]

Maucher

[11] Patent Number: 4,538,718
[45] Date of Patent: Sep. 3, 1985

[54] CLUTCH DISC ARRANGEMENT

[75] Inventor: Paul Maucher, Sasbach, Fed. Rep. of Germany

[73] Assignee: LuK Lamellen und Kupplungsbau GmbH, Bühl, Fed. Rep. of Germany

[21] Appl. No.: 394,830

[22] Filed: Jul. 2, 1982

[30] Foreign Application Priority Data

Jul. 7, 1981 [DE] Fed. Rep. of Germany ....... 3126694

[51] Int. Cl.$^3$ .............................................. F16D 3/66
[52] U.S. Cl. .................... 192/106.2; 464/64; 464/68
[58] Field of Search ............... 192/70.17, 106.1, 106.2; 464/62, 64, 66, 68

[56] References Cited

U.S. PATENT DOCUMENTS

| | | | |
|---|---|---|---|
| 3,203,205 | 8/1965 | Geibel et al. ...................... | 192/106.2 |
| 3,266,271 | 8/1966 | Stromberg ........................ | 192/106.2 |
| 3,327,820 | 6/1967 | Maurice ........................... | 192/106.2 |
| 3,800,931 | 4/1974 | Maucher .......................... | 192/70.17 |
| 4,036,341 | 7/1977 | Beeskaw et al. ................. | 192/106.2 |
| 4,410,075 | 10/1983 | Caray et al. ...................... | 192/106.2 |
| 4,412,606 | 11/1983 | Loizeau ............................ | 192/106.2 |

FOREIGN PATENT DOCUMENTS 2436288 10/1977 Fed. Rep. of Germany .
2742524 3/1978 Fed. Rep. of Germany ... 192/106.2

Primary Examiner—Rodney H. Bonck
Attorney, Agent, or Firm—Peter K. Kontler

[57] ABSTRACT

A clutch disc arrangement for use in friction clutches of automotive vehicles has a hub with a flange which is riveted to two axially spaced annular disc-shaped guides flanking the radially innermost portion of a clutch disc which carries two friction coatings. First coil springs are interposed between the clutch disc and the guides to yieldably urge the clutch disc to a neutral angular position with reference to the hub. Once the clutch disc is moved through a preselected angle beyond such neutral position, its further angular movement relative to the hub is resisted by an axially resilient friction disc which is outwardly adjacent to one of the guides and bears against the one guide directly as well as through the medium of a friction pad. Additional coil springs are interposed between the friction disc and the one guide to yieldably oppose angular displacement of the clutch disc relative to the hub after the clutch disc has moved through a given angle beyond the neutral position. The clutch disc, or a reinforcing disc which is riveted to the clutch disc, has axially extending arms which overlie the one guide and extend, with at least some clearance as considered in the circumferential direction of the hub, into peripheral recesses of the friction disc.

31 Claims, 4 Drawing Figures

CLUTCH DISC ARRANGEMENT

BACKGROUND OF THE INVENTION

The present invention relates to improvements in clutches in general, and more particularly to improvements in friction disc arrangements of the type disclosed, for example, in U.S. Pat. No. 3,203,205 granted Aug. 31, 1965 to Geibel et al.

The clutch disc arrangement which is disclosed by Geibel et al. comprises two lateral disc-shaped guides which rotate with the radially outwardly extending mounting flange of a hub and flank a clutch disc which carries the customary friction coatings. The clutch disc has limited freedom of angular movement relative to the hub and/or vice versa. For the sake of simplicity, reference will be made to rotation of the clutch disc relative to the hub with the understanding, however, that the situation is the same if the hub turns relative to the clutch disc and/or if the clutch disc and the hub turn in the opposite directions or in the same direction but at different speeds. At least certain stages of angular movement of the clutch disc relative to the hub are opposed by suitable energy storing devices in the form of coil springs which are inserted into windows or openings provided therefor in the clutch disc and in at least one of the disc-shaped guides on the hub. An advantage of clutch disc arrangements of the type disclosed by Geibel et al. is that they can transmit pronounced torque even if their dimensions are relatively small.

It is often desirable or necessary to transmit a pronounced or maximum torque only after a certain angular displacement of the clutch disc relative to the hub (i.e., the resistance to initial angular displacement of the clutch disc relative to the hub should be less than during the next-following stage or stages of angular movement of the clutch disc). As proposed in German Pat. No. 24 36 288 granted Oct. 6, 1977 to the assignee of the present application, this can be achieved by installing a so-called load friction unit between one of the guides (which rotate with the hub) and the clutch disc. The load friction unit which is disclosed in the German patent comprises at least one friction disc, a friction pad and energy storing springs installed between the guides and the friction disc to oppose at least certain stages of angular movement of the clutch disc relative to the guides. In this manner, one can ensure that, when the clutch disc leaves a neutral angular position, the initial stage of its angular movement relative to the hub is opposed by a soft or smooth damping action whereas the load friction unit becomes effective only when the angular displacement of the clutch disc relative to the hub progresses beyond the aforementioned initial stage. The damping action during such second or further stage or stages of angular displacement of the clutch disc relative to the hub is much more pronounced than during the initial stage or stages.

OBJECTS AND SUMMARY OF THE INVENTION

An object of the invention is to provide a friction clutch arrangement wherein one or more load friction units cooperate with the other parts of the clutch disc arrangement in a particularly simple and effective manner.

Another object of the invention is to provide a clutch disc arrangement which constitutes an improvement over and a further development of that disclosed in the aforementioned patent to Geibel et al.

A further object of the invention is to provide a clutch disc arrangement wherein numerous conventional components are assembled with one or more load friction units in a novel and improved way.

An additional object of the invention is to provide novel and improved load friction units which can be installed in and cooperate in a novel way with the parts of conventional clutch disc arrangements.

Still another object of the invention is to provide a clutch disc arrangement whose versatility greatly exceeds that of heretofore known clutch disc arrangements, which can be utilized in a wide variety of friction clutches or analogous devices, and whose damping characteristics are superior to those of conventional clutch disc arrangements.

A further object of the invention is to provide a clutch, such as a friction clutch for use in automotive vehicles, which embodies the improved clutch disc arrangement.

Another object of the invention is to provide a clutch disc arrangement whose dimensions need not exceed those of heretofore known clutch disc arrangements but which is more versatile, more reliable and better suited for use under a variety of widely different circumstances than conventional clutch disc arrangements.

The invention is embodied in a clutch disc arrangement, especially for use in the clutches of automotive vehicles. The improved arrangement comprises a first component including a hub and first and second annular washer-like guides rotatable with the hub (they can be riveted or otherwise fastened to a circumferential flange or collar of the hub) and defining between themselves an annular space which surrounds the hub, a second component which includes a one-piece or composite clutch disc having a portion disposed in the annular space between the guides and being rotatable within limits relative to the first component, first energy storing means (e.g., in the form of coil springs distributed around the hub) interposed between the first and second components to yieldably urge the second component to a predetermined neutral angular position with reference to the first component and to yieldably resist at least some (e.g., the initial) stages of rotation of the second component relative to the first component, and means for yieldably opposing rotation of the second component relative to the first component after the second component completes a predetermined angular movement from its neutral position. The rotation opposing means comprises a friction disc which is disposed outside of the annular space, at least one friction pad (also called frictional disc) interposed between the friction disc and the first component, and second energy storing means interposed between the friction disc and the first component and being operative to yieldably oppose certain stages of rotation of the friction disc relative to the first component. The second component further comprises friction coatings which are provided on the clutch disc and serve to engage the adjacent surface of a flywheel as well as the adjacent surface of a pressure plate when the improved clutch disc arrangement is installed in a friction clutch of the type wherein the clutch disc is clamped between the flywheel and the pressure plate under the action of a diaphragm spring when the clutch is engaged. The first energy storing means can be interposed between the clutch disc and the first and/or second guide of the first component.

The friction pad of the rotation opposing means can be installed outside of the annular space between the two guides of the first component. The second energy storing means can be interposed between the friction disc and at least one of the guides.

In accordance with a presently preferred embodiment of the invention, the friction disc and the friction pad of the rotation opposing means can be installed adjacent to the outer side of one of the guides, namely, adjacent to that side which faces away from the annular space between the guides. The first component can comprise means for biasing the friction disc against one of the guides.

The rotation opposing means can further comprise a second friction disc which is also disposed outside of the annular space between the two guides and at least one additional friction pad which is interposed between the second friction disc and the first component. The second energy storing means is interposed between the second friction disc and the first component and is operative to yieldably oppose certain stages of rotation of the second friction disc relative to the first component. One of the friction discs is then outwardly adjacent to one of the guides and the other friction disc is outwardly adjacent to the other guide. Otherwise stated, the friction discs are or can be adjacent to those (outer) sides of the respective guides which face away from the annular space. The friction pads are then interposed between the corresponding friction discs and the respective guides. One of the friction discs and the associated friction pad are preferably operative to yieldably oppose rotation of the second component from its neutral position in one direction (e.g., clockwise), and the other friction disc and the corresponding friction pad are then operative independently of the one friction disc and its associated friction pad to yieldably oppose rotation of the second component from the neutral position in the opposite (counterclockwise) direction. As stated above, the one friction disc and its associated friction pad can be held in frictional engagement with one of the guides, and the other friction disc as well as its associated friction pad are then held in frictional engagement with the other guide of the first component.

If the rotation opposing means comprises a single friction disc, one of the two discs (namely, one of the parts including the friction disc and the clutch disc) can be provided with a projection which is engageable with the other of these discs in response to angular displacement of the second component relative to the first component. The projection preferably overlies one of the guides and the friction pad, as considered in the axial direction of the hub. The clutch disc arrangement can further comprise a friction generating unit which is interposed between the clutch disc and the first component (preferably in the annular space), and the projection preferably overlies such unit. The one disc can constitute or include the clutch disc; for example, the clutch disc can include a reinforcing disc which is provided with the aforementioned projection or projections. The clutch disc can comprise an additional disc which carries the friction coating means and is riveted to the reinforcing disc. The projection or projections can form integral parts of the reinforcing disc; they may constitute or resemble arms which are bent out of the general plane of the reinforcing disc and are disposed radially outwardly of the guide which is overlapped by the projection or projections.

The other of the two discs can be provided with a recess for the projection of the one disc, and the recess is preferably dimensioned in such a way that it receives the projection with at least some clearance, as considered in the circumferential direction of the hub, so that the clutch disc can turn relative to the friction disc to an extent which is determined by the width of the clearance. The difference between the width of the recess and the width of the projection, as considered in the circumferential direction of the hub, determines the extent of the aforementioned predetermined angular movement of the second component from its neutral position.

The friction disc is preferably resilient (at least in part), as considered in the axial direction of the hub, and bears against the first component. To this end, the clutch disc arrangement preferably further comprises means for maintaining the friction disc in prestressed condition. The friction disc can constitute or resemble a washer having a radially innermost portion surrounding the hub, and the means for maintaining the friction disc in prestressed condition can comprise a stressing member which is rigid with the first component and bears against the radially innermost portion of the washer. The stressing member can be rigid with the hub, e.g., by resorting to those rivets or analogous fastener means which secure the guides to the flange of the hub. At least one additional friction pad can be interposed between the stressing member and the friction disc. The radially outermost portion of the washer-like friction disc can be adjacent to the respective friction pad, and such friction pad can be biased by the friction disc against the radially outermost portion of the respective guide.

Each of the friction pads can constitute a circumferentially complete annulus or it can be assembled of several discrete sections, e.g., a set of arcuate sections which are adhesively secured or otherwise bonded to the friction disc or to the stressing member to constitute a composite annulus.

The novel features which are considered as characteristic of the invention are set forth in particular in the appended claims. The improved clutch disc arrangement itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
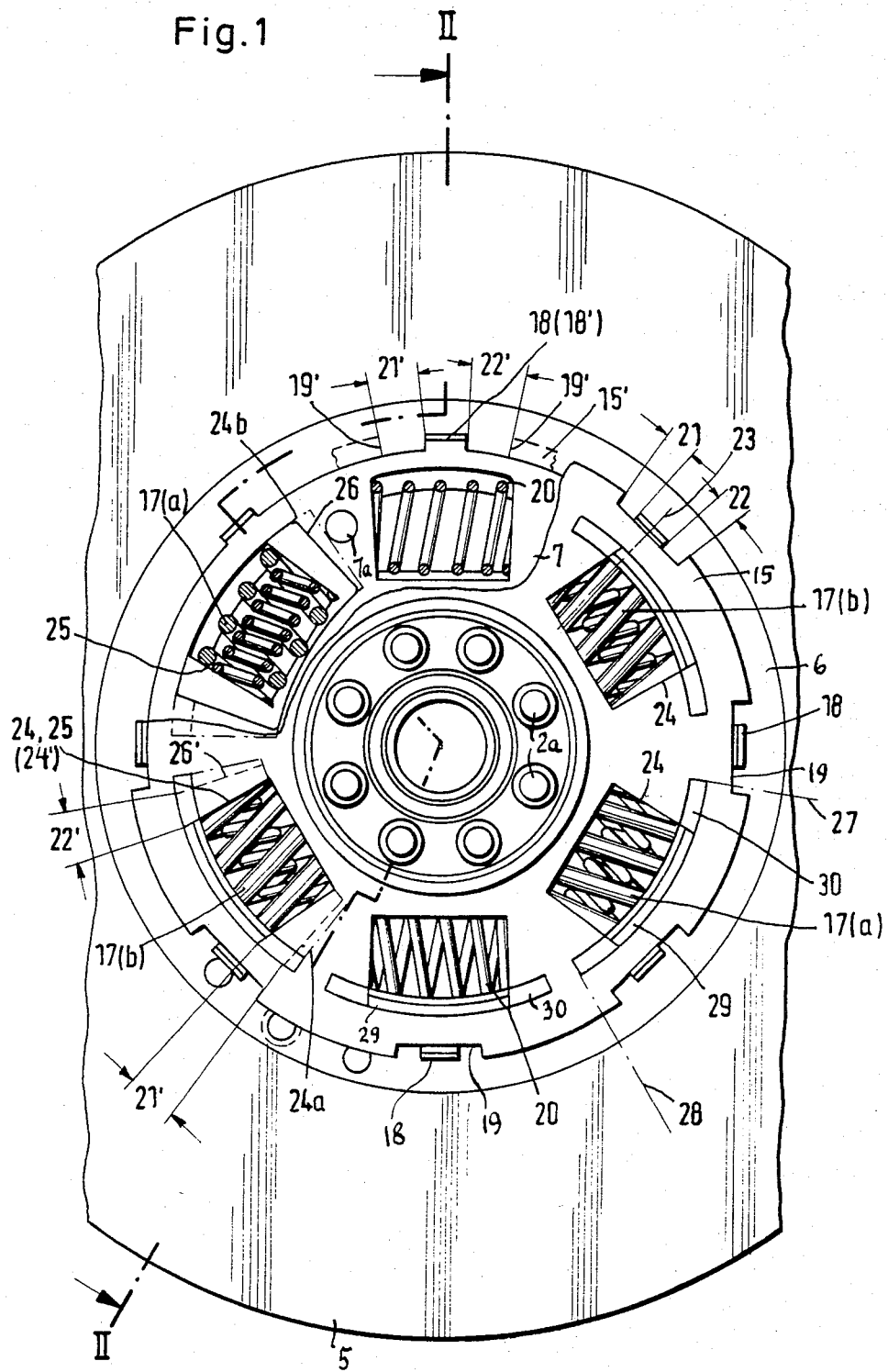
FIG. 1 is a fragmentary elevational view of a clutch disc arrangement which embodies the invention.
Figure 2:
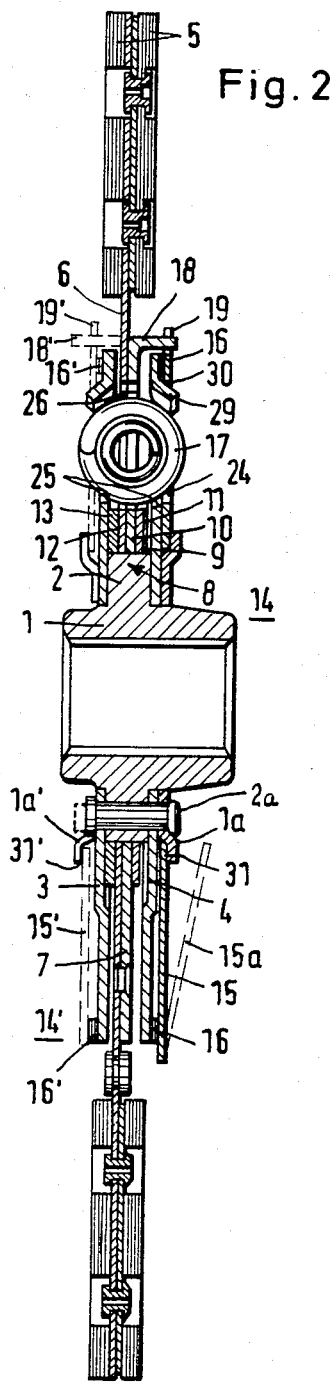
FIG. 2 is a sectional view substantially as seen in the direction of arrows from the line II—II of FIG. 1.

FIGS. 1 and 2 illustrate a clutch disc arrangement which comprises a hub 1 having a radially outwardly extending mounting flange 2 for two lateral disc-shaped washer-like guides 3 and 4 which are non-rotatably secured to the flange 2 by an annulus of rivets 2a or analogous fasteners. The guides 3, 4 are spaced apart from one another, as considered in the axial direction of the hub 1, and thus define an annular space for the innermost portion of a washer-like clutch disc 6 which carries the customary friction coatings 5. One of these coatings can be engaged by the flywheel on the crankshaft of an engine and the other coating 5 can be engaged by a pressure plate when the clutch disc arrangement of the present invention is used in a friction clutch which can establish a torque-transmitting connection between the crankshaft of the engine and the input shaft of a change-speed transmission in an automotive vehicle. The inner portion of the clutch disc 6 is adjacent to a reinforcing disc 7 which is secured thereto by rivets 7a (one shown in FIG. 1). The annular space between the guides 3 and 4 further accommodates a friction generating unit 8 which is effective when the friction disc 6 turns relative to the hub 1. The friction generating unit 8 comprises an undulate annular member 9, a first annular supporting member 10, a first friction liner 11 at one side of the clutch disc 6, a second friction liner 12 at the other side of the friction disc 6, and a second annular supporting member 13.

The clutch disc arrangement of FIGS. 1 and 2 further comprises a so-called load friction unit 14 which forms part of a device that yieldably opposes rotation of the component including the parts 5, 6 and 7 relative to the component including the parts 1, 2, 3 and 4. The load friction unit 14 is disposed outside of the annular space between the guides 3, 4, namely, at the outer side of the guide 4 (the right-hand side of the guide 4, as viewed in FIG. 2). The unit 14 comprises a friction disc 15 and a friction pad 16. The friction disc 15 cooperates with energy storing coil springs 17 which also form part of the rotation opposing device.

The friction disc 15 is a resilient component which is installed in prestressed condition. When permitted to assume its unstressed condition, the disc 15 slopes radially toward the hub 1 and away from the guide 4, i.e., the disc 15 then assumes the broken-line position 15a of FIG. 2. The clutch disc arrangement comprises a dished stressing member 1a which is secured to the outer side of the guide 4 and to the hub 1 by the aforementioned rivets 2a so that the radially innermost portion of the disc 15 is held in the solid-line position of FIG. 2 in which such innermost portion is adjacent to and bears against the outer side of the guide 4. The disc 15 then urges the friction pad 16 against the radially outermost portion of the guide 4.

The reinforcing disc 7 is formed with integral projections in the form of arms 18 which extend axially of the clutch disc arrangement to overlie the parts 9, 10 and 11 of the friction generating unit 8 as well as the guide 4 and the friction pad 16 and to extend with clearance into recesses in the form of peripheral slots 19 machined into the outer marginal portion of the disc 15.

The clutch disc arrangement further comprises resilient elements in the form of coil springs 20 which are inserted into windows provided therefor in the parts 3, 4, 6 and 7. The windows have identical sizes and shapes, and the springs 20 are active during each and every stage of angular movement of the friction disc 6 relative to the hub 1 and/or vice versa. These springs assist the action of the friction generating unit 8. The initial stage of angular movement of the component including the parts 5, 6 and 7 from a predetermined neutral angular position 23 (see FIG. 1) with reference to the component including the parts 1, 2, 3 and 4 is resisted by the springs 20 and the friction generating unit 8.

The clutch disc 6 can turn relative to the hub 1 in a first direction and through a first angle 21 as well as in a second direction and through a similar second angle 22. During such angular displacement of the clutch disc 6 relative to the hub 1, only the energy storing coil springs 20 and the friction generating unit 8 are effective, i.e., the parts 8 and 20 oppose rotation of the clutch disc 6 relative to the hub 1.

Figure 3:
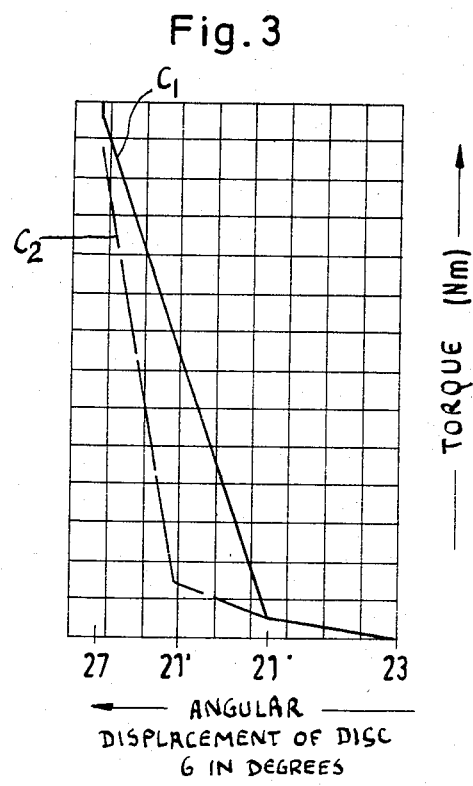
FIG. 3 is a diagram wherein the angular displacement of the clutch disc relative to the hub is measured along the abscissa and the torque is measured along the ordinate.

Once the angular displacement of the clutch disc 6 from its neutral position 23 exceeds the angle 21 or 22, the arms 18 of the reinforcing disc 7 strike against the nearest portions of surfaces bounding the respective peripheral recesses slots 19 in the friction disc 15 so that the disc 15 shares the angular displacement of the clutch disc 6 relative to the hub 1 against the opposition of coil springs 17 as well as against the opposition of the friction pad 16. The coil springs are installed in windows 24 of the friction disc 15 as as in windows 25 of the guides 3 and 4. The dimensions of windows 24 match those of the windows 25. The parts 6 and 7 formed with windows 26 which are larger than the windows 24 and 25 (as considered in the circumferential direction of the hub 1), namely, their dimensions are selected in such a way that the coil springs 17 engage with the radial surfaces bounding the windows 26 in the clutch disc 6 and reinforcing disc 7 in response to angular displacement of the clutch disc 6 through the angle 21 or 22, i.e., to the one or the other side of the neutral angular position indicated by the line 23. The coil springs 17 store energy when the clutch disc 6 and the reinforcing disc 7 continue to turn relative to the hub 1 (namely, through an angle exceeding that shown at 21 or 22); at such time, the angular movement of the parts 6 and 7 is shared by the friction disc 15 because the latter is caused to turn by the arms 18 of the reinforcing disc 7. When the friction disc 15 rotates with the discs 6 and 7, it turns relative to the guides 3 and 4 whereby the friction pad 16 generates a braking moment and the coil springs 17 oppose rotation of the friction disc 15. The variations of torque during rotation of the clutch disc 6 in one direction relative to the hub 1 (namely, from the neutral angular position 23 and through and beyond the angle 21) are indicated in the diagram of FIG. 3 by a solid-line curve C1.

The extent to which the friction coatings 5 (i.e., the friction disc 6) can turn relative to the hub 1 is limited by wing-like projections 29 which are integral with the guide 4 and extend into arcuate slots 30 of the friction disc 15. The angular movement of the disc 6 relative to the hub 1 in a clockwise direction, as viewed in FIG. 1, is terminated when the surfaces 27 bounding the first end portions of the slots 30 in the friction disc 15 reach the respective projections 29, and the angular movement of the disc 6 relative to the hub 1 in a counterclockwise direction, as viewed in FIG. 1, is terminated when the surfaces 28 bounding the second end portions of the slots 30 in the friction disc 15 reach the respective projections 29, i.e., the length of the slots 30 and the difference between the length of such slots and the length (as considered in the circumferential direction of the friction disc 15) of the projections 29 will determine the maximum extent of angular displacement of the clutch disc 6 and the reinforcing disc 7 with reference to the hub 1. The projections 29 can constitute outwardly bent integral portions of the guide 4. The maximum extent of angular displacement of the disc 6 relative to the hub 1 in a counterclockwise direction, as viewed in FIG. 1, is also denoted by the curve C1 in the diagram of FIG. 3.

The friction disc arrangement of FIGS. 1 and 2 can further comprise a second load friction unit 14' at the outer side of the guide 3. Such second load friction unit is shown by broken lines and is a mirror image of the unit 14 with reference to a symmetry plane which is normal to the axis of the hub 1 and is disposed midway between the guides 3 and 4. Though a second load friction unit is optional, it can be provided in many instances to enhance the action of or to complement the first unit.

As shown in FIG. 2, the unit 14' comprises a load friction disc 15' which consists of a resilient material and is mounted in prestressed condition by having its radially innermost portion biased against the outer side of the guide 3 by a dished stressing member 1a'. The radially outermost portion of the friction disc 15' bears against one or more friction pads 16' which are thereby urged against the adjacent radially outermost portion of the outer side of the guide 3. The clutch disc 6 is formed with several projections in the form of arms 18' which overlie the parts 12, 13 of the friction generating unit 8 between the clutch disc 6 and the guide 3 and which also overlie the guide 3. The tips of the arms 18' extend with clearance into recesses 19' which constitute peripheral slots of the friction disc 15'. The clutch disc 6 and the reinforcing disc 7 can be said to constitute a composite clutch disc which has arms 18 extending to one side (as considered in the axial direction of the hub 1) and into the respective slots 19, as well as arms 18' extending to the other side and into the respective slots 19'.

A clutch disc arrangement which embodies two load friction units (14 and 14') can be designed in such a way that the two load friction units operate independently of each other and within different ranges of angular movement of the clutch disc 6 relative to the hub 1. The coil springs 20 then form two groups one of which includes one or more coil springs received in identically dimensioned windows of the clutch disc 6, reinforcing disc 7, guides 3, 4 and friction discs 15, 15'. The spring or springs 20 of the one group are then effective as soon as the clutch disc 6 leaves the neutral angular position 23 and moves in a counterclockwise direction, as viewed in FIG. 1, to cover the angle 21. The spring or springs 20 of the other group are effective when the clutch disc 6 leaves the neutral angular position 23 and turns in a clockwise direction, as viewed in FIG. 1, so as to cover the angle 22. The friction generating unit 8 is effective within the same range of angular movements of the clutch disc 6 relative to the hub 1, i.e., within the range including the angles 21 and 22. When the clutch disc 6 turns from the neutral angular position 23 and through an angle which exceeds that shown at 21 or 22, the arms 18 of the reinforcing disc 7 strike against the adjacent portions of surfaces in the respective slots 19 and cause the friction disc 15 to turn with the clutch disc 6 until the portions 27 or 28 of surfaces bounding the arcuate slots 30 reach the respective projections 29 as described above in connection with the unit 14. During rotation of the friction disc 15 with the clutch disc 6, the friction pads 16 also resist rotation of the disc 6 relative to the hub 1. Furthermore, at such time two of the springs 17 (namely, those denoted by the reference characters 17(a) and disposed diametrically opposite each other with reference to the axis of the hub 1) are engaged by portions of surfaces bounding the windows 26 in the discs 6, 7. Thus, the springs 17a are engaged by the surfaces bounding the windows 26 of the discs 6 and 7, by the surfaces bounding the windows 24 of the friction disc 15 (which then turns with the discs 6, 7 relative to the guides 3, 4) and the springs 17a *react against the surfaces bounding the windows 25 in the guides 3 and 4. This causes the springs 17a to store energy.*

The second friction unit 14' can become effective only after an angular displacement through the angle 21' or 22', i.e., when the arms 18' of the clutch disc 6 engage the adjacent portions of surfaces bounding the corresponding slots 19' of the friction disc 15' so that the latter begins to rotate with the discs 6, 7 relative to the hub 1 as well as with reference to the guides 3, 4. Note the curve $C_2$ in FIG. 3. The friction pad or pads 16' then oppose angular displacement of the friction disc 15' relative to the guide 3. The windows 26' provided in the discs 6, 7 for the coil springs 17(b) of the second group are longer than the windows 26 so as to ensure that the springs 17(b) will become effective after an angular displacement of the clutch disc 6 through a relatively large angle 21' or 22'. Portions of surfaces bounding the windows 26' of the discs 6, 7 then bear against the springs 17(b), the same as portions of surfaces bounding the windows 24' of the friction disc 15' so that such springs are caused to store energy while reacting against the surfaces surrounding the windows 25 in the guides 3, 4 until the angular displacement of the friction disc 15' relative to the clutch disc 6 is terminated when the projections 29 are engaged by the respective ends of the surfaces surrounding the corresponding slots 30.

In the just discussed embodiment of the improved clutch disc assembly, the length of the windows (24, 24') in the friction discs 15, 15' for those springs (17(b), 17(a)) which do not cooperate with the corresponding discs 15, 15' is selected in such a way that it suffices to ensure that the friction discs 15, 15' can turn relative to the windows without striking against the springs. Note, for example, the phantom-line window 24a in the friction disc 15 and the phantom-line window 24b in the friction disc 15'.

It is often desirable or advantageous to provide at least one additional friction pad 31 between the stressing member 1a and the friction disc 15 and/or at least one friction pad 31' between the stressing member 1a' and the friction disc 15'.

An important advantage of the improved clutch disc arrangement is that it can employ numerous parts of heretofore known arrangements and that the conversion requires little time and resort to readily available tools. Thus, all that is necessary to convert a heretofore known clutch disc arrangement into one embodying the present invention is to install the unit 14 and/or 14' outwardly adjacent to the guide 4 and/or 3 and to construct and install the energy storing means 17 in the aforedescribed manner. The addition of one or more units 14, 14' in accordance with the present invention enhances the versatility of the thus obtained clutch disc arrangement as concerns the achievable characteristics of damping action upon angular displacements of the component including the clutch disc 6, reinforcing disc 7 and friction coatings 5 from its neutral angular position relative to the component which includes the hub 1, its flange 2 and the guides 3, 4.

The convertibility of a conventional clutch disc arrangement into one embodying the present invention is possible because the parts of the unit 14 and/or 14' need not be installed in the annular space which is flanked by the inner sides of the guides 3, 4 and surrounds the flange 2 of the hub 1. Thus, a maker of clutches or clutch disc arrangements can maintain a supply of heretofore known clutch disc arrangements and can rapidly convert a desired number of such conventional arrangements into assemblies or arrangements which embody the present invention by the simple expedient of adding the unit 14 and/or 14' outside of the aforediscussed annular space surrounding the hub 2. The remaining parts of the clutch disc arrangement need not be altered at all. At the very most, the composite clutch disc including the parts 6 and 7 and forming part of a conventional clutch disc arrangement must be replaced with a clutch disc which exhibits the projections 18 and/or 18' so that they can extend into the recesses 19 and/or 19' of the respective friction discs 15, 15'. However, even this can be avoided by the very simple expedient of providing the recesses 19, 19' in the discs 6, 7 and by providing the outer marginal portions of the friction discs 15, 15' with the respective projections or arms 18 and 18'. In either event, the addition of the unit 14 and/or 14' to a conventional clutch disc arrangement contributes little, if anything, to the bulk of the thus modified arrangement.

As mentioned above, the units 14, 14' can be effective in parallelism with or independently of one another, i.e., one unit can be effective when the clutch disc 6 is caused to rotate relative to the component 1 to 4 in one direction, and the other of the units 14, 14' is then effective when the clutch disc 6 rotates in the opposite direction from its neutral angular position 23.

Figure 4:
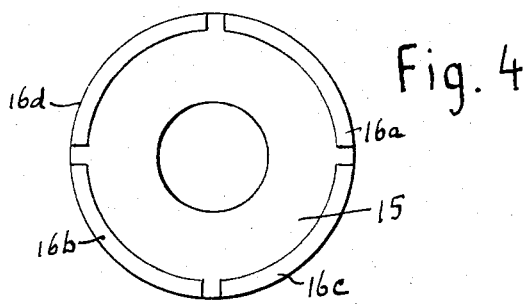
FIG. 4 is an elevational view of a friction disc with a composite annular friction pad.

It is further within the purview of the invention to provide additional resilient means for urging a relatively stiff (i.e., non-resilient) friction disc 15 or 15' against the respective guide. However, it is presently preferred to select the material and the configuration of the friction discs 15, 15' in such a way that they exhibit a certain amount of resiliency, as considered in the axial direction of the hub 1. Owing to such design of the friction discs 15, 15', it suffices to provide relatively simple stressing members 1a and 1a' which bias the radially innermost portions of the substantially washer-like friction discs 15, 15' against the respective guides of the component including the parts 1 to 4. The friction pads 16 and 16' are preferably interposed between the radially outermost portions of the washer-like guides 15, 15', and the radially outermost portions of substantially washer-like guides 3 and 4. Each of the friction pads 16, 16', 31, 31' can be a one-piece annulus or it may constitute a composite pad consisting of several discrete sections which are adhesively secured or otherwise bonded to the friction disc 15 or 15' or to the stressing member 31 or 31'. This is shown in FIG. 4 wherein the friction disc 15 carries a composite friction pad consisting of four arcuate sections 16a, 16b, 16c, 16d together forming a circular or annular pad. If desired, the friction pads 31, 31' can be used in lieu of the friction pads 16, 16'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch disc arrangement, especially for the clutches of automotive vehicles, comprising a first component including a hub and first and second annular guides rotatable with said hub and defining between themselves an annular space surrounding said hub; a second component including a clutch disc having portion in said space and being rotatable within limits relative to said first component; first energy storing means interposed between said components to urge said second component to a neutral position and to yieldably resist at least some stages of rotation of said second component relative to said first component; and means for yieldably opposing rotation of said second component relative to said first component after said second component completes a predetermined angular movement from said neutral position, comprising a washer disposed outside of said space and having a radially innermost portion, said washer being resilient as considered in the axial direction of said hub and bearing against said first component, means for maintaining said washer in prestressed condition including a stressing member rigid with said first component and bearing against said innermost portion of said washer, at least one friction pad interposed between said washer and said first component, and second energy storing means interposed between said washer and said first component and being operative to yieldably oppose certain stages of rotation of said washer relative to said first component.

2. The arrangement of claim 1, wherein said stressing member is rigid with said hub.

3. The arrangement of claim 1, further comprising at least one additional friction pad interposed between said stressing member and said washer.

4. The arrangement of claim 3, wherein said additional friction pad comprises a plurality of discrete sections.

5. A clutch disc arrangement, especially for the clutches of automotive vehicles, comprising a first component including a hub and first and second annular guides rotatable with said hub and defining between themselves an annular space surrounding said hub; a second component including a clutch disc having a portion in said space and being rotatable within limits relative to said first component; first energy storing means interposed between said components to urge said second component to a neutral position and to yieldably resist at least some stages of rotation of said second component relative to said first component; and means for yieldably opposing rotation of said second component relative to said first component after said second component completes a predetermined angular movement from said neutral position, comprising a friction disc mounted on said first component outside of said space, at least one friction pad interposed between said friction disc and said first component, and second energy storing means interposed between said friction disc and said first component and being operative to yieldably oppose certain stages of rotation of said friction disc relative to said first component following the initial stage of such rotation.

6. The arrangement of claim 1, wherein said first component further includes fastener means for securing said guides to said hub, said second component further including friction coating means provided on said clutch disc and said first energy storing means being interposed between said clutch disc and at least the first of said guides.

7. The arrangement of claim 1, wherein said friction pad is disposed outside of said space.

8. The arrangement of claim 1, wherein said second energy storing means is interposed between said friction disc and at least the first of said guides.

9. The arrangement of claim 1, wherein one of said guides has an inner side flanking said space and an outer side, said friction disc and said friction pad being adjacent the outer side of said one guide.

10. The arrangement of claim 1, further comprising means for biasing said friction disc against one of said guides.

11. The arrangement of claim 1, wherein said rotation opposing means further comprises a second friction disc disposed outside of said space and at least one additional friction pad interposed between said friction disc and said first component, said second energy storing means being interposed between said second friction disc and said first component and being operative to yieldably oppose certain stages of rotation of said second friction disc relative to said first component.

12. The arrangement of claim 11, wherein each of said guides has an inner side flanking said space and an outer side, said friction discs being adjacent the outer sides of the respective guides.

13. The arrangement of claim 12, wherein said friction pads are disposed between the corresponding friction discs and the respective guides.

14. The arrangement of claim 11, wherein one of said friction discs and the associated friction pad are operative to yieldably oppose rotation of said second component from said neutral position within a first range of angular movements and the other of said friction discs and the corresponding friction pad are operative independently of said one friction disc and the associated friction pad to yieldably oppose rotation of said component from said neutral position within a different second range of angular movements.

15. The arrangement of claim 10, wherein said one friction disc and the associated friction pad are in frictional engagement with said first guide and said other friction disc and the corresponding friction pad are in frictional engagement with said second guide.

16. The arrangement of claim 1, wherein one of said discs has at least one projection engageable with the other of said discs in response to angular displacement of said second component relative to said first component.

17. The arrangement of claim 16, wherein said projection overlies one of said guides and said friction pad, as considered in the axial direction of said hub.

18. The arrangement of claim 17, further comprising a friction generating unit interposed between said clutch disc and said first component, said projection further overlying said unit.

19. The arrangement of claim 16, wherein said one disc is said clutch disc and said clutch disc comprises a reinforcing disc, said projection being provided on said reinforcing disc.

20. The arrangement of claim 19, wherein said clutch disc further comprises an additional disc and friction coating means provided on said additional disc.

21. The arrangement of claim 19, wherein said projection is integral with said reinforcing disc.

22. The arrangement of claim 21, wherein said projection is an arm which is bent from the general plane of said reinforcing disc and is disposed radially outwardly of one of said guides.

23. The arrangement of claim 16, wherein the other of said discs has a recess for said projection, said recess receiving said projection with at least some clearance, as considered in the circumferential direction of said hub, so that said clutch disc can turn relative to said friction disc to an extent which is determined by the width of said clearance.

24. The arrangement of claim 23, wherein the difference between the width of said recess and the width of said projection, as considered in the circumferential direction of said hub, determines the extent of said predetermined angular movement of said second component from said neutral position.

25. The arrangement of claim 1, wherein said friction disc is resilient, as considered in the axial direction of said hub, and bears against said first component.

26. The arrangement of claim 25, further comprising means for maintaining said friction disc in prestressed condition.

27. The arrangement of claim 1, wherein said friction disc is a washer having a radially outermost portion, said friction pad being interposed between said outermost portion of said friction disc and one of said guides.

28. The arrangement of claim 27, wherein said one guide is a washer having a radially outermost portion and said friction pad is adjacent to the outermost portion of said one guide.

29. The arrangement of claim 1, wherein said friction pad comprises a plurality of discrete sections.

30. The arrangement of claim 29, wherein said sections are bonded to said friction disc.

31. The arrangement of claim 29, wherein said sections have an arcuate shape and together constitute a composite annulus.

* * * * *